United States Patent [19]

Stewart

[11] Patent Number: 4,838,109
[45] Date of Patent: Jun. 13, 1989

[54] REACTION CABLE ASSEMBLY INCLUDING CABLE SLACK ADJUSTING MEANS

[75] Inventor: Vernon E. Stewart, Moberly, Mo.

[73] Assignee: Orscheln Co., Moberly, Mo.

[21] Appl. No.: 164,422

[22] Filed: Mar. 4, 1988

[51] Int. Cl.$^4$ ............................................... F16C 1/22
[52] U.S. Cl. ........................... 74/501.5 R; 192/111 R
[58] Field of Search ........................... 74/501.5, 502.4; 188/196 R, 196 M, 71.7, 196 B; 192/111 R

[56] References Cited

U.S. PATENT DOCUMENTS

| | | | |
|---|---|---|---|
| 2,363,228 | 11/1944 | Cade | 74/501.5 |
| 3,200,912 | 8/1965 | Bouvat-Martin | 188/196 B |
| 3,768,612 | 10/1973 | Gale . | |
| 3,789,967 | 2/1974 | Dau et al. . | |
| 4,271,718 | 6/1981 | Bopp et al. . | |
| 4,344,518 | 8/1982 | Gilmore . | |
| 4,378,713 | 4/1983 | Haskell et al. . | |
| 4,598,809 | 7/1986 | Glover et al. . | |
| 4,669,330 | 6/1987 | Stocker . | |
| 4,693,137 | 9/1987 | Deligny . | |

OTHER PUBLICATIONS

"Do and Don'ts of a Parking Brake System Design", Orscheln Co. (undated sales brochure).

"Inserts and Locking Nuts Quick-Acting Inserts", Northwestern Tools, Inc., Catalog #48, Jul. 1986, p. 16.

Primary Examiner—Peter A. Aschenbrenner
Attorney, Agent, or Firm—Laubscher, Presta & Laubscher

[57] ABSTRACT

A parking brake cable assembly of the reaction conduit type is disclosed including a cable slack adjusting device connecting a second inner strand brake operating member with the floating reaction bracket that is displaced upon straightening of an initially bent conduit associated with a first inner strand brake operating member. The cable slack adjusting device includes a bracket housing containing a first opening that is connected with one end of the reaction conduit and that receives the first inner strand member, and a second opening that receives for free axial displacement a cylindrical end fitting that is connected at one end with the second inner strand member. The other end of the cylindrical end fitting is provided with an abutment against which one end of a compression spring abuts. The other end of the compression spring engages a quick-release adjustment or lock-out knob that is operable to a disengaged condition in which the compression spring expands to remove slack from the cable.

9 Claims, 3 Drawing Sheets

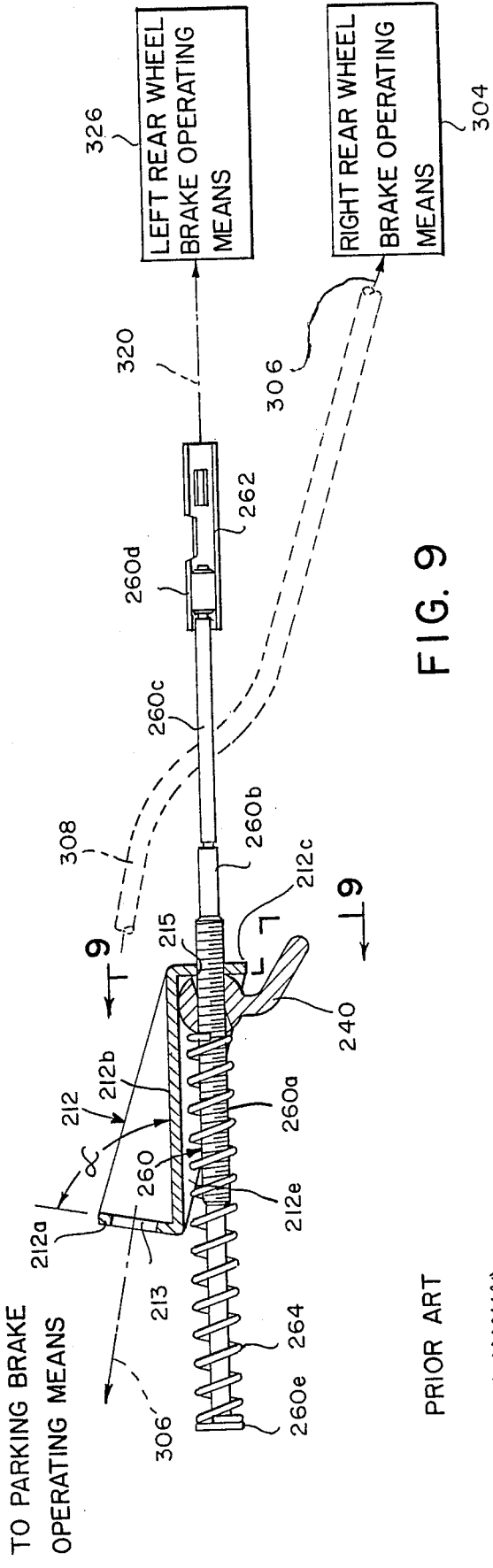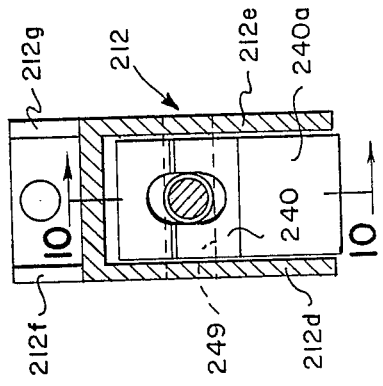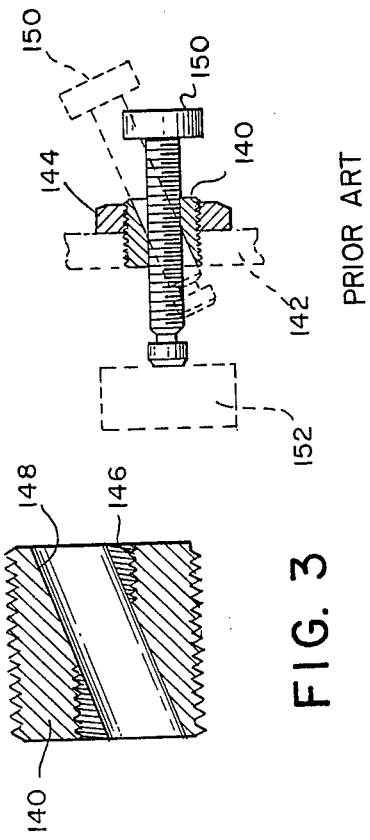

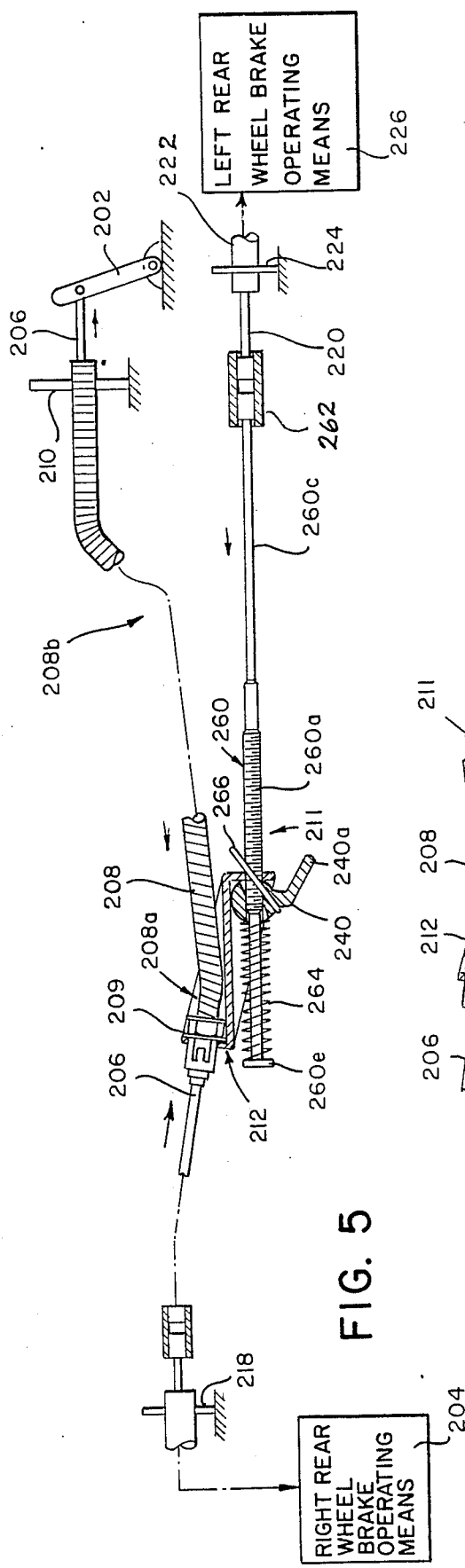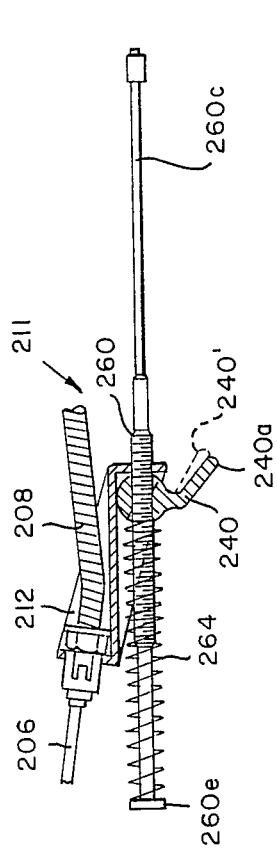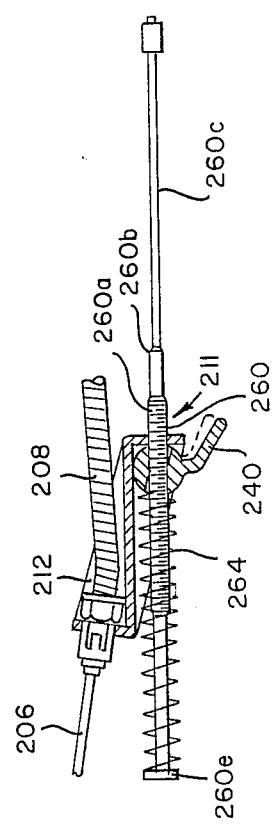
FIG. 5
FIG. 6
FIG. 7

REACTION CABLE ASSEMBLY INCLUDING CABLE SLACK ADJUSTING MEANS

BRIEF DESCRIPTION OF THE PRIOR ART

It is well known in the patented prior art to provide cable slack adjusting means in cable systems for automotive vehicles. Evidence of such devices is presented by the patents to Gale U.S. Pat. No. 3,768,612, Dau et al U.S. Pat. No. 3,789,967, Bopp et al U.S. Pat. No. 4,271,718 and Haskell et al U.S. Pat. No. 4,378,713, among others.

It is also known in the prior art to provide quick-acting inserts of a type including a longitudinal threaded bore and an intersecting angularly arranged non-threaded bore, whereupon a threaded bolt shaped object mounted in threaded relation within the threaded bore may be quickly operated to a released condition by pivoting the bolt-shaped member to a position contained in the non-threaded bore, thereby to permit quick release actions and displacement of the bolt-shaped member. An example of such a quick-acting insert is contained on Page 16 of the Catalog 48 of the July 1986, sales brochure of Northwestern Tools, Inc. The use of such a quick-release type device in a cable length adjuster is shown in the Stocker U.S. Pat. No. 4,669,330. In this device, a threaded locking member is arranged for pivotal movement between engaged and disengaged conditions relative to a housing, thereby to permit longitudinal movement of the locking member for adjusting the length of the associated cable. A relatively recent development in the parking brake cable system is the so-called "conduit reaction system" in which in the parking brake operating means is connected with one of the rear wheel brake operating means via a slightly bent reaction conduit that extends through an opening contained in a reaction bracket. The other rear wheel brake operating means is so connected with the reaction bracket that when the operating member is displaced to tension the inner strand member to operate the first wheel brake operating means, the reaction conduit is caused to straighten somewhat, thereby to displace the reaction bracket and the second strand to operate the other rear wheel brake operating means. Examples of such conduit reaction systems are set forth in the undated publication "Do and Don'ts of a Parking Braking System Design" of Orscheln Co. of Moberly, Mo.

The present invention was developed to provide an improved parking brake operating system of the reaction conduit type including means for taking up initial cable slack at the point of assembly and which provides the capability of readjustment at subsequent times to maintain a desired cable tension.

SUMMARY OF THE INVENTION

Accordingly, a primary object of the present invention is to provide an improved parking brake system of the reaction cable type including a normally-bent reaction conduit containing an inner strand member that connects the operating means with one rear wheel brake control means, a floating reaction bracket to which one end of the reaction conduit is connected, a second inner strand member connected at one end with the other rear wheel brake operating means, and a cable slack adjusting device connecting the outer end of the second strand member with the reaction bracket. The cable slack adjusting means includes a compression spring that is normally maintained in a condition of compression, said compression spring being releasable to displace the corresponding end of the second strand member in a direction to remove slack from the reaction-type parking brake cable system. In this manner, the installer may manually pre-tension the brake cables at the initial point of installation, and thereafter, maintain the tension through manual adjustment of the mechinism at any given time.

In accordance with a more specific object of the invention, the cable slack adjusting means includes a housing including a horizontal wall portion, and a pair of longitudinally spaced transversely-arranged upwardly and downwardly extending transverse wall portions, respectively. For assuring the desired initial bend in the reaction conduit, one of the transverse wall portions is arranged at an acute angle relative to the horizontal wall portion, and contains a first opening to which one end of the reaction conduit is connected. The first strand member associated with this bent reaction conduit extends through the first opening contained in the angularly arranged transverse wall. The other transverse wall contains a second opening that receives the cylindrical end fitting of the cable slack adjuting means, said cylindrical end fitting having an externally threaded portion adjacent the second transverse wall portion. The end fitting is adapted for connection at one end with the adjacent end of the second strand member, and on the other side of the transverse wall portion is arranged an adjusting knob or lock-out knob that is normally threaded mounted on the threaded portion of the end fitting. Mounted concentrically on the end fitting between the adjusting knob and an integral abutment on the end fitting is a compression spring that is normally caged in a compressed condition. The adjusting knob is of the quick-release type including an unthreaded bore extending angularly relative to, and in communication with, the threaded bore, whereby upon pivotal movement of the adjusting knob by handle means associated there-with, the adjusting knob may be displaced to a released condition relative to the end fitting thereby to release the compression spring to longitudinally displace the end fitting in a direction to remove slack from the parking brake cable system.

BRIEF DESCRIPTION OF THE DRAWINGS

Other objects and advantages of the invention will become apparent from a study of the following specification when viewed in the light of the accompanying drawings, in which:

FIGS. 3 and 4 are sectional views of a quick-acting insert of the of the prior art, and a quick-acting insert with locking nut arrangement, respectively;

FIG. 5 is a schematic illustration of the improved reaction-type brake cable system of the present invention, including cable slack adjusting means in the initial spring-compressed caged shipping condition;

FIGS. 6 and 7 illustrate the apparatus of FIG. 5 when in the "uncaged" or released condition and in the reconnected condition, respectively;

FIG. 8 is a detailed sectional view of the cable slack adjusting device of the present invention, illustrating schematically the manner in which it might be used in connection with a system corresponding to that of FIG. 2;

FIG. 9 is a sectional view taken along line 9—9 of FIG. 8, and

FIG. 10 is a sectional view taken along line 10—10 of FIG. 9.

DETAILED DESCRIPTION

Figure 1:
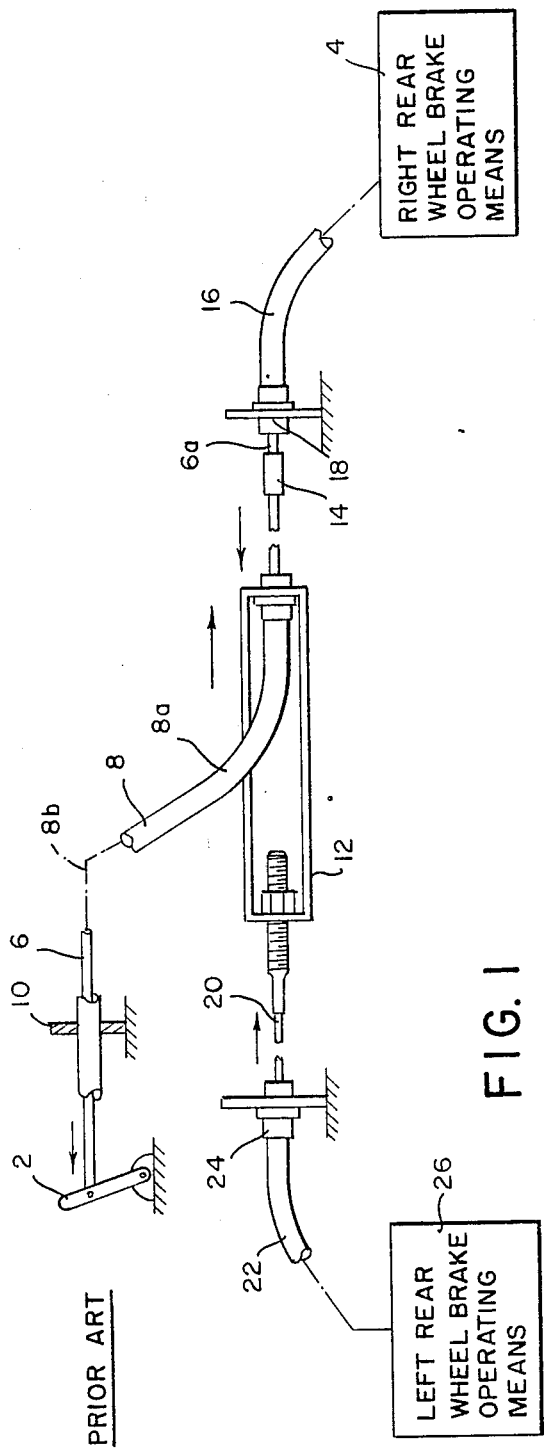
FIGS. 1 and 2 are diagrammatic representations of two types of cable reaction systems of the prior art for use in parking brake systems.

Referring more particularly to the prior art reaction condutit parking brake cable system of FIG. 1, the parking brake operating lever 2 is connected with the right rear wheel brake operating means 4 via a first inner strand member 6 that extends longitudinally through a tubular reaction conduit 8. One end of the reaction conduit 8 is secured to the chassis frame by a fixed support 10, and the other end of the reaction conduit is rigidly connected with a floating reaction bracket 12 having a transverse end wall containing a first opening to which the adjacent end of the reaction conduit is connected. The inner strand member 6 is connected by a connector 14 within an inner strand extension 6a that extends longitudinally through conduit 16 that is fastened at one end with the vehicle chassis by a fixed connector 18. As is known in the reaction conduit art, the reaction conduit 8 contains at least one bent portion 8a which initially has approximately a 90° bend when the inner strand 6 is in the untensioned condition. Connected with the other end of the reaction bracket 12 is the inner cable member 20 of a second cable assembly. The second strand 20 passes through a second conduit 22 that is connected at one end with a chassis by fixed connecting means 24, the other end of the cable strand 20 being connected with the left rear wheel brake operating means 26. As is known in the art, when operating lever 2 is piovted in the counter-clockwise direction, the first inner strand member 6 is tensioned (as shown by the arrows) to operate the right rear wheel operating means 4. As a consequence of the tensioning of the inner strand 6, the initially bent reaction conduit 8 tends to straighten, thereby placing the reaction conduit under compression, whereby the floating reaction bracket 12 is displaced to the right to longitudinally displace the second inner strand member 20 to the right to operate the left rear wheel brake means 26.

Figure 2:
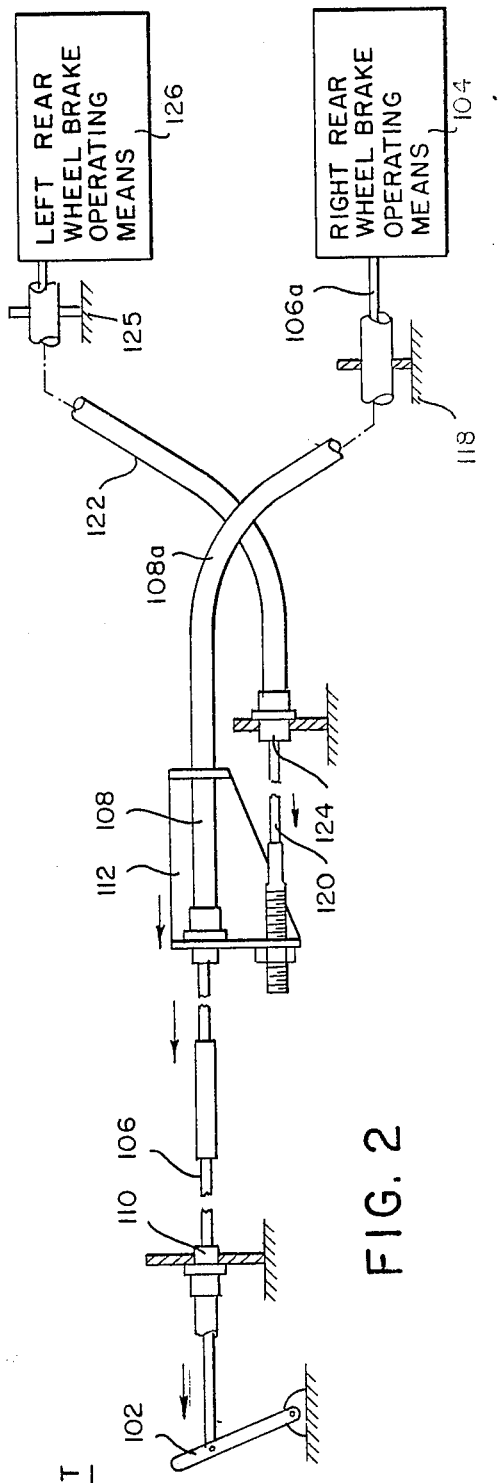

In the prior art parking brake cable system of FIG. 2, the second inner strand member 120 is arranged on the same side of the floating reaction braket 112 as the reaction conduit 108. Thus, in this embodiment, the parking brake operating lever 102 is connected with the right rear wheel operating means 104 by the first inner strand member 106 that extends to the brake means via fixed conduit support 110, the first opening in the reaction bracket 112, the tubular conduit reaction conduit 108, and the fixed support 118. The second inner strand member 120 is connected at one end with the floating reaction bracket 112, and extends at its other end for connection with the associated brake means via fixed support 124, the associated outer conduit 122, and the fixed support 125. In this embodiment, when the lever 102 is pivoted in the counterclockwise direction, the first inner cable member 106 is tensioned (as shown by the arrows) to operate the right wheel brake operating means 104, which tensioning is accompanied by straightening of the initially bent reaction conduit 108. Owing to the straightening of the of the reaction conduit 108, the reaction bracket is displaced to the left to tension the second inner strand member 120 to operate the left rear wheel brake operating means 126.

Referring now to FIGS. 3 and 4, it is known in the art to provide a quick-acting insert 140 that is arranged for mounting in a threaded opening contained in support 142 by a locking nut 144. The quick-acting insert contains a threaded longitudinal through bore 146, and an intersecting angularly arranged non-threaded bore 148. A clamping bolt 150 is normally threadably mounted within the threaded bore 146 to engage a workpiece 152. In order to effect quick release, the bolt member 150 is pivoted upwardly to the position shown in phantom, whereupon the threads on the bolt member 150 are disengaged from the threads on the threaded bore 146, thereby to permit axial displacement of the locking bolt to the position shown in phantom in FIG. 4.

Referring now to FIG. 5, in accordance with the present invention, cable slack adjusting means 211 are provided for removing slack from a reaction-type parking brake cable system. More particularly, the inner strand member 206 that connects the parking brake lever 202 with the right rear wheel brake operating means 204 extends through a reaction conduit 208 containing bent portions 208a and 208d. At one end, the reaction conduit 208 is supported by a fixed support member 210 that is rigidly connected with the chassis, and at the other end the reaction conduit is connected by connector means 209 with a floating reaction bracket housing 212, the structure of which is shown more clearly in FIG. 8. The inner cable member 206 extends through a first opening 213 (FIG. 8) contained in a first vertical transverse wall portion 212a that extends upwardly from the horizontal wall portion 212b. The reaction bracket housing also includes a downwardly extending second transverse wall portion 212c that contains a second wall opening 215. Mounted for longitudinal displacement in this second wall opening 215 is a cylindrical cable slack adjusting member 260 having an externally threaded central portion 260a. At its right hand end, the cylindrical body is connected by a crimped or swaged connection 260b with an inner strand member 260b having an end fitting 260d by means of which connector 262 serves to connect the end fitting with the associated inner strand member 220, which leads to the left rear wheel brake operating means 226 via conduit 222 and fixed support 224, as shown (FIG. 5). At its left hand end, the cylindrical end fitting has an enlarged protuberence portion 260e that serves as an abutment for engagement by one end of a helical compression spring 264 that is mounted concentrically on the cylindrical end fitting. At its right hand end, the compression spring 264 reacts against a quick-release slack adjusting or lock-out knob 240 that in normally threadably mounted on the threaded portion of the cylindrical end fitting. As shown in FIGS. 9 and 10, the slack-adjusting knob 240 contains a threaded through bore 246 and an angularly arranged intersecting non-threaded bore 248. The knob also contains a transversely extending clean-out bore 249 that passes through the intersection axes of the axes of the threaded and angularly-arranged unthreaded bores. The slack adjusting knob is provided with an integral handle portion 240a for pivoting the knob from its normal thread-engaged position (FIG. 5, 7 and 8) relative to the cylindrical end fitting 260 and the released position 240' illustrated in phantom in FIG. 6. The sidewalls of the knob are parallel planar surfaces as shown in FIG. 9, which surfaces are adjacent a pair of parallel spaced longitudinally and downwardly extending sidewall portions 212d and 212e of the reaction bracket housing 212, as shown in FIG. 9. Similarly, the reaction housing includes a pair of parallel spaced longitudinally and upwardly extending sidewall portions 212f and 212g between which the reaction conduit 208 extends, as shown in FIGS. 5-7. In order to assure the desired appropriate bend in the reaction cable, the first vertical transverse wall portion 212a is arranged at an acute angle α relative to the horizontal housing wall 212b.

OPERATION

In operation, assume that the vehicle is in the brake-released condition of FIG. 5, a plastic tie having been wrapped around the end line adjuster assembly for securing all components in place during shipment. Following removal of the plastic tie, the lock-out cable-slack adjusting knob 240 is operated by its handle portion 240a to pivot the knob in the counterclockwise direction toward the released position 240 shown in FIG. 6, whereupon the threads of the longitudinal bore 246 are disengaged from the threads on the cylindrical end fitting to permit expansion of the compression spring 264, whereupon the cylindrical end fitting 260 is shifted to the left relative to the reaction housing 212, thereby to remove slack from the second inner strand member 220.

When an equilibrium position is reached, the slack-adjusting lock-out knob 240 is pivoted to effect reengagement between the threads of threaded bore 246 and the external threads of the cylindrical end fitting member 260, whereupon the parking brake system may now be operated in a conventional reaction conduit manner.

The system of FIGS. 5-7 corrseponds generally with the arrangement of FIG. 1. In FIG. 8, an alternate arrangement is illustrated in phantom that corresponds generally with the system of FIG. 2. Various other types of arrangements, of course could be proposed using the cable slack removing means of the present invention.

While the preferred forms and embodiments of the invention have been illustrated and described, it will be apparent to those skilled in the art that other changes and modfications may be made without deviating from the invention set forth above.

What is claimed is:

1. A parking brake operating system for a vehicle or the like including an operating member movably connected with the vehicle chassis, and a pair of wheel brake operating means, comprising:
   (a) a floating reaction bracket housing , including:
      (1) a horizontal wall portion; and
      (2) first and second transversely-extending vertical wall portions extending upwardly and downwardly from said horizontal wall portion, respectively, said first and second vertical wall portions containing first and second openings, respectively;
   (b) a reaction cable assembly including:
      (1) a first outer tubular conduit connected at opposite ends with said reaction housing and with said chassis, respectively; and
      (2) a first inner strand mounted for relative longitudunal movement within said first conduit, said first strand extending through said first housing opening, opposite ends of said first strand being connected with said operating member and with one of said wheel brake operating means, respectively;
   (c) a second inner strand connected at one end with the other of said wheel brake operating means; and
   (d) cable slack adjusting means connecting the other end of said second strand with said housing;
   (e) said housing first and second vertical wall portions having different angle of inclination relative to said horizontal wall portion, thereby to cause said reaction cable assembly to normally have a slighty bent condition when said first and second strands are untensioned and said brake operating means are each in a brake-disengaged condition, whereby upon tensioning of said first strand by operation of said operating member to operate the associated wheel brake means, the cable assembly is at least partly straightened to tension said second strand and thereby operate the other wheel brake means.

2. Apparatus as defined in claim 1, wherein said cable slack adjusting means comprises:
   (1) a generally cylindrical end fitting mounted for longitudinal displacement in a second opening in said housing in a direction generally parallel with the adjacent portion of said first outer conduit, at least the portion of said end fitting adjacent said second housing opening being externally threaded;
   (2) means connecting one end of said end fitting with the adjacent end of said second strand;
   (3) an enlarged abutment on the other end of said end fitting;
   (4) quick-release adjusting knob means threadably mounted on said end fitting threaded portion on the opposite said of said second housing opening as said one fitting end; and
   (5) a helical compression spring concentrically mounted under compression on said end fitting between said abutment and said adjustment knob, whereby upon release of said adjustment knob, said compression spring expands to bias said end fitting in a direction to remove slack from said second strand.

3. Apparatus as defined in claim 2, wherein said quick-release adjustment knob means comprises a knob member containing a longitudinally-extending threaded through bore adapted for threaded connection with said cylindrical end fitting threaded portion, said knob member also containing a first non-threaded bore angularly arranged relative to, and in intersecting communication with, said threaded bore, said knob member including a handle portion for pivoting said knob member between engaged and released positions in which the threaded portion of said end fitting is contained in said threaded and non-threaded knob bores, respectively.

4. Apparatus as defined in claim 3, wherein said housing further includes a pair of parallel spaced longitudinally extending support wall portions arranged on opposite sides of said adjusting knob.

5. Apparatus as defined in claim 4, wherein said adjusting knob includes a pair of planar said walls normal to said threaded bore, said side walls being in engagement with said support walls, respectively.

6. Apparatus as defined in claim 5, wherein said adjusting knob contains a transverse unthreaded through bore extending between, and normal to, said side walls, the axis of said transverse bore containing the point of intersection of said threaded and first unthreaded bores, respectively.

7. Apparatus as defined in claim 2, wherein said first and second strands extend in opposite directions from said reaction bracket housing for connection which their respective wheel brake operating means, respectively.

8. Apparatus as defined in claim 2, wherein said first and second strands extend in the same direction from said reaction bracket housing for connection with their respective wheel brake operating means, respectively.

9. A parking brake operating system for a vehicle or the like including an operating member movably connected with the vehicle chassis, and a pair of wheel brake operating means, comprising:

(a) a floating reaction bracket housing (212) having at least one longitudinal wall portion (212b), and first (212a) and second (212c) generally transversely-extending wall portions containing first (213) and second (215) openings, respectively;

(b) a reaction cable assembly including:
 (1) a first outer tubular conduit (208,308) connected at opposite ends with said reaction housing first opening and with said chassis, respectively; and
 (2) a first inner strand (206,306) mounted for relative longitudinal movement within said first conduit, said first strand extending through said first housing opening and being connected at opposite ends with said operating member and with one of said wheel brake operating means, respectively;

(c) a second inner strand (260,360) connected at one end with the other of said wheel brake operating means;

(d) cable slack adjusting means (211) connecting the other end of said second inner strand with said second housing opening; and (e) means on said housing causing said reaction cable assembly to normally have a slightly bent condition when said first and second strands are untensioned and said brake operating means are each in a brake-disengaged condition, whereby upon tensioning of first strand by operation of said operating member to operate said one wheel brake means, the cable assembly is at least partly straightened to tension said second strand and thereby operate said other wheel brake means.

* * * * *